UNITED STATES PATENT OFFICE.

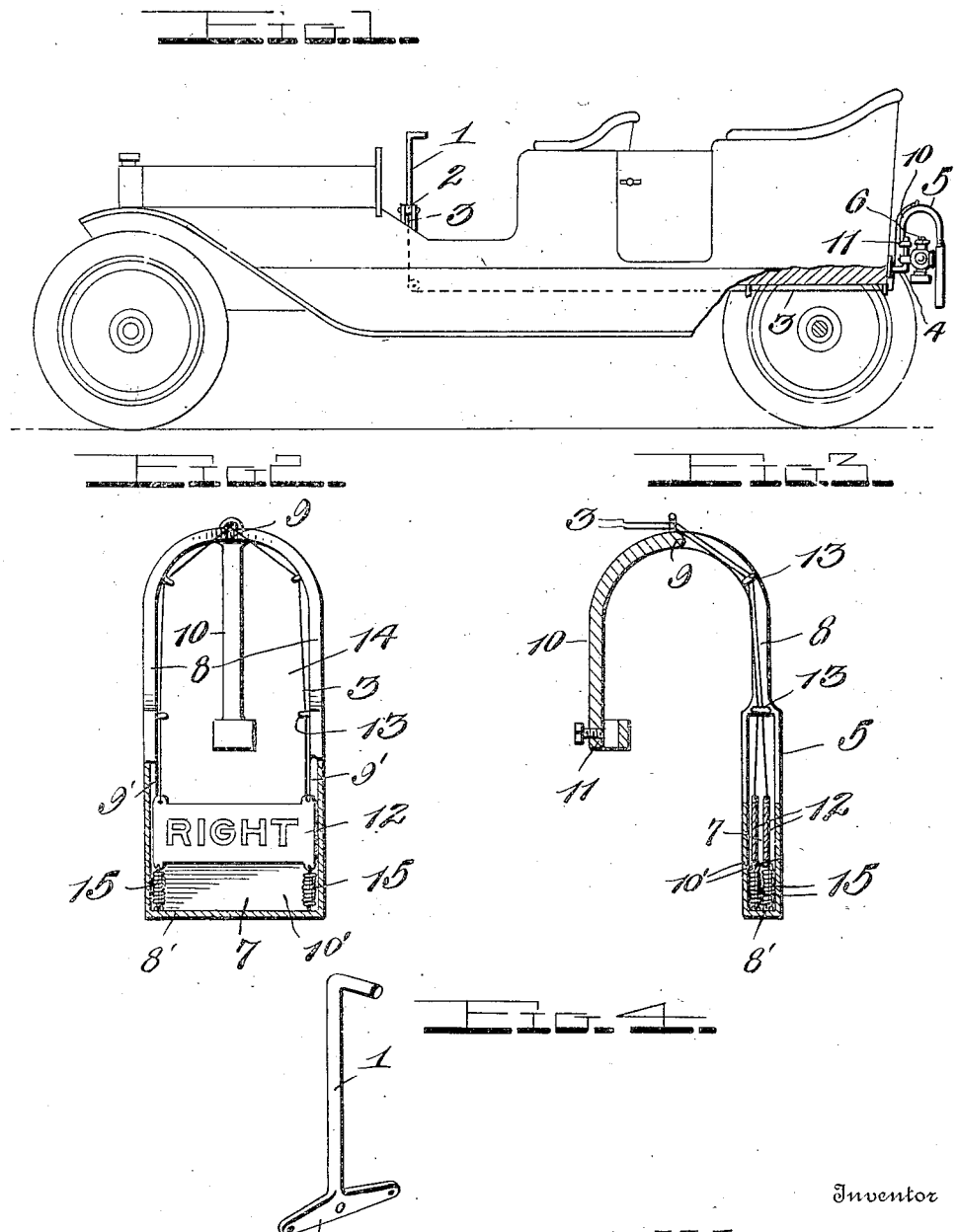

ALLEN H. LEWIS, OF WICHITA, KANSAS.

VEHICLE SIGNAL DEVICE.

1,054,007. Specification of Letters Patent. Patented Feb. 25, 1913.

Application filed August 28, 1911. Serial No. 646,334.

*To all whom it may concern:*

Be it known that I, ALLEN H. LEWIS, a citizen of the United States, residing at Wichita, in the county of Sedgwick and State of Kansas, have invented certain new and useful Improvements in Vehicle Signal Devices, of which the following is a specification, reference being had to the accompanying drawings.

This invention relates to signal devices intended to be used and displayed on the rear end of vehicles and to the method and manner of operating and controlling the same.

The main objects of my invention are first, to provide a means for indicating at the rear of the vehicle just what the driver's intentions are, whether he is going to turn to the right or left; second to provide a means for the control of said signaling device.

A further object of my invention is to provide a device of this character which will possess advantages in points of efficiency, durability, is inexpensive of manufacture and at the same time is simple in construction and operation.

With the above and other objects in view the invention consists in the novel features of construction and the combination and arrangement of parts hereinafter described, pointed out in the claims and shown in the accompanying drawings, in which—

Figure 1 is a side elevation of an automobile shown in dotted lines, having my invention applied thereto. Fig. 2 is a rear elevation; Fig. 3 is a vertical sectional view; and Fig. 4 is a detail perspective view of the operating lever.

Referring more particularly to the drawings 1 indicates a lever pivotally mounted in the front end of the automobile and having a transverse bar 2 formed integral with the lower end thereof. Secured to each end of the transverse bar 2 is a wire 3 that extends to the rear of the automobile running underneath the entire length of the body.

Adjustably mounted upon the lamp bracket 4, is the plate holder 5 which is adapted to be disposed in front of the lamp 6. This plate holder consists of a vertically extending arm 10 having formed at its lower extremity a clamp 11 which is adapted to be adjustably mounted upon the lamp bracket 4. The upper extremity of this arm 10 is curved outwardly as at 9 and has extending therefrom a pair of oppositely converging arms 8 which extend equidistant on each side of the arm 10. The lower extremities of the arms 8 extend substantially parallel with the arm 10 and are connected at their lower extremities by a transverse portion 8'. The lower extremities of these arms 8 are enlarged and each have formed therein a guide way 9' for the purpose which will be hereinafter described. This plate holder is made preferably of sheet metal, but of course, the same may be cast from any suitable metal as desired and the lower extremities of the arms 8 are connected by transverse plates 10' which form a pocket 7 being open at its upper end. Mounted within this pocket 7 of the plate holder is a pair of signal plates 12 one of which bearing the word "left" and the other "right" and the said plates being composed of any transparent or translucent material. The upper edge of each of these plates is provided with apertured extensions to which are connected the wires 3 and the said wires are adapted to pass up through the guides 13 formed upon the inner faces of the arms 8 and then through the guides formed upon the curved portion 9 of the bracket to the transverse bar 2 provided in the forward end of the machine for operating the said plates. To provide means for holding these signal plates within the recess 7 I provide coil springs 15 which are secured at one end to the apertured extensions formed on the lower edge of each of the plates and their opposite ends being connected to the transverse member 8' of the plate holder.

In the operation of this device, if the person operating the automobile wishes to turn to the left he will notify any one behind him of his intentions by turning the lever to the left, thus pulling the plate marked left up to register with the opening 14 above the pocket 7 so that it will be visible to any one in the rear and when he has turned far enough he will release the lever and the plate will be drawn back out of sight by the coil springs 15 secured to the lower edge thereof. If the signal is used in the daytime the letters on the plate are in black and large enough to be seen at a distance far enough away to prevent a collision and at night the lamp will light the plates up so that they can be seen at quite a distance.

While I have shown and described the preferred form of my invention it will be obvious that various changes in the details of construction and in the proportions may be resorted to for successfully carrying my invention into practice without sacrificing any of the novel features or departing from the scope thereof.

Having thus described my invention, I claim:—

1. A signal device of the character described, consisting of a plate holder comprising an arm, a clamp formed at the lower extremity of said arm, the medial portion of said arm being curved, the opposite end of said arm depending from said curved portion and being bifurcated, the bifurcated portions of said arm extending parallel with the opposite end of the arm and arranged equidistant on each side thereof, the lower ends of the bifurcated portions being enlarged, transverse members connecting the enlarged bifurcated portions to form a pocket, guide ways formed within the enlarged bifurcated portions, signal plates normally housed within the pocket and adapted to operate within said guide ways, and means for operating said signal plates, substantially as described.

2. A signal device of the character described, comprising a plate holder consisting of a vertically extending arm, means for adjustably holding the lower end of said arm upon a support, a pair of arms extending parallel to each other and spaced from the first named arm, there being a curved portion connecting said arms, the lower extremity of each of said parallel arms being provided with an enlarged portion, transverse members connecting the enlarged portions to form a pocket, signal plates slidingly mounted within said pocket, coil springs for normally holding said signal plates within said pocket, and means for raising said plates above said pocket.

In testimony whereof I hereunto affix my signature in the presence of two witnesses.

ALLEN H. LEWIS.

Witnesses:
 GEO. W. CARPENTER,
 WM. R. NESSLY.